United States Patent [19] [11] 4,156,773
Loucks et al. [45] May 29, 1979

[54] PROCESS FOR CAPPING QUINONE-COUPLED POLYPHENYLENE OXIDES

[75] Inventors: George R. Loucks, Scotia; Dwain M. White, Schenectady, both of N.Y.

[73] Assignee: General Electric Company, Schenectady, N.Y.

[21] Appl. No.: 800,645

[22] Filed: May 26, 1977

[51] Int. Cl.$^2$ .................. C08G 65/44; C08G 65/48
[52] U.S. Cl. .................................. 528/214; 528/212; 528/213; 528/215
[58] Field of Search ................ 260/47 ET; 528/212, 528/213, 214, 215

[56] References Cited

U.S. PATENT DOCUMENTS

| | | | |
|---|---|---|---|
| 3,375,228 | 3/1978 | Holoch et al. | 260/47 |
| 3,573,254 | 3/1971 | Factor | 260/47 |
| 3,736,291 | 5/1973 | Vogel | 260/47 R |
| 3,784,575 | 1/1974 | Rutledge | 260/396 R |
| 3,970,640 | 7/1976 | Yonemitsu et al. | 260/47 ET |
| 3,987,068 | 10/1976 | Reilly | 260/396 R |

*Primary Examiner*—Lester L. Lee
*Attorney, Agent, or Firm*—F. Wesley Turner; Joseph T. Cohen; Charles T. Watts

[57] ABSTRACT

A process is disclosed which provides for an increase in the oxidative and/or thermal stability of quinone coupled polyphenylene oxides which comprises contacting quinone-coupled polyphenylene oxides with a capping agent in the presence of a water soluble base, and a catalytic phase transfer agent. The resulting new polymers have improved color and in combination with styrene resins provide thermoplastic compositions having improved chemical and physical properties.

10 Claims, No Drawings

PROCESS FOR CAPPING QUINONE-COUPLED POLYPHENYLENE OXIDES

Cross Reference to Related Applications

This invention is related to subject matter disclosed in our copending U.S. application Ser. Nos. 800,646, 800,647 and 800,648, all filed on May 26, 1977. All of the aforesaid applications are also our inventions and are assigned to the same assignee as the assignee of this application. All of the disclosures referenced above are incorporated herein in their entirety by reference.

BACKGROUND OF THE INVENTION

1. Field of the Invention

This invention relates to the process for increasing the oxidative and/or thermal stability of quinone-coupled polyphenylene oxides by contacting the quinone-coupled polyphenylene oxides with a capping agent in the presence of a water soluble base and a catalytic phase transfer agent.

2. Description of the Prior Art

Hay et al., U.S. Ser. No. 613,072, now U.S. Pat. No. 4,048,143, discloses the capping of polyphenylene oxides having an average hydroxyl group per molecule of 1.0 or less as described in various U.S. patent applications including Hay's U.S. Pat. Nos. 3,306,879, 3,914,266; application Ser. No. 540,473, filed Jan. 13, 1975, now U.S. Pat. No. 4,028,341; a continuation-in-part of Ser. No. 441,295, filed Feb. 11, 1974, now abandoned; and Olander's U.S. Pat. Nos. 3,956,442, 3,965,069, 3,972,851; and Ser. No. 582,910, filed June 2, 1975, now U.S. Pat. No. 4,054,553. All the Hay and Olander disclosures referenced above are incorporated herein in their entirety by reference.

In White's copending U.S. patent application Ser. No. 800,635, filed on May 26, 1977, new polyphenylene oxide quinone-coupled polymers having an average hydroxyl group per molecule value greater than 0, including 2.0 or less are described. These new polymers either alone or in combination with polyphenylene oxide reaction products of the prior art, i.e. polyphenylene oxides having an average hydroxyl group per molecule value greater than zero including 1.0 or less can be capped as described in greater detail hereafter to form other polymers having increased oxidative and thermal stability.

DESCRIPTION OF THE INVENTION

This invention embodies a process for increasing the oxidative and/or thermal stability of quinone-coupled polyphenylene oxides by contacting the quinone-coupled polyphenylene oxides with a capping agent in the presence of the water soluble base and a catalytic phase transfer agent.

Broadly, the quinone-coupled polyphenylene oxides employed in my process are illustrated by the formula

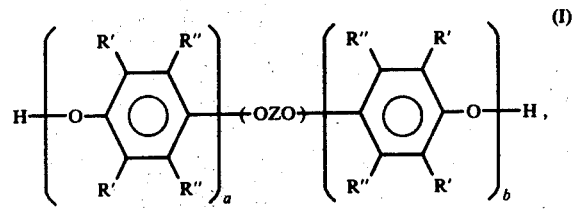

wherein independently each $-(OZO)-$ is a divalent quinone residue, Z is a divalent arene radical, either a or b is at least equal to 1, the sum of a plus b is preferably at least equal to 10, more preferably 40 to 170, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen. A presently preferred quinone-coupled polyphenylene oxide is of formula (I) above wherein independently each R' is hydrogen, a hydrocarbon radical, a halohydrocarbon radical, and even more preferably is a methyl radical, R" being hydrogen.

Broadly, the quinone-coupled polyphenylene oxides can be prepared as described in our copending U.S. application Ser. No. 800,646, referenced hereinbefore.

Broadly, the capping agents that can be employed in our process are illustrated by the following formulae:

including mixtures thereof, wherein R is alkyl, cycloalkyl, aryl or mixtures thereof, such as alkaryl, alkcycloalkyl, aralkyl, arcycloalkyl, cycloalkaryl, etc., and X is chlorine, bromine, fluorine or iodine. Preferably, the R groups contain from about 1 to about 30 carbon atoms, and more preferably contain from about 1 to about 20 carbon atoms.

Representative examples of specific capping agents include the following:

(A) monoacyl halides of formula (II) above, e.g. acetyl fluoride, acetyl chloride, acetyl bromide, the propionyl halides, butyryl halide, stearoyl halides, benzoyl chloride, toluoyl halides, naphthoyl halides, cinnamoyl halides, etc.;

(B) monsulfonyl halides of formula (III) above, e.g. methanesulfonyl chloride, benzenesulfonyl halides, toluene sulfonyl bromide, xylene sulfonyl halides, etc.;

(C) anhydrides of monocarboxylic acids of formula (IV) above, e.g. acetic anhydride, propionic anhydride, octanoic anhydride, benzoic anhydride, toluic anhydride, butyric anhydride, pivalic anhydride, m-dichlorobenzoic anhydride, 2,3,4,5,6-tentachlorobenzoic anhydride, pentaoic anhydride, palmatoic anhydride, stearic anhydride, etc.;

(D) alkyl halides of formula (V) above, e.g. methylchloride, methylbromide, methyliodide, isopropyl halides, amyl halides, hexadecyl halides, cyclopentyl halides, 1-halo-1, 3-dimethylcyclopentanes, diphenyldihalomethanes, triphenyl halomethanes, etc.; and (E) dialkylsulfates of formula (VI) above, e.g. dimethyl sulfate, diethyl sulfate, dibutyl sulfate, diisoamyl sulfate, dicyclohexyl sulfate, didodecyl sulfate, di(octadecyl) sulfate, etc. A presently preferred capping agent is acetic anhydride since it is a readily available inexpensive capping agent.

Our process is carried out by introducing a capping agent to a solution of a quinone-coupled polyphenylene oxide under fluid mixing conditions wherein the liquid reaction medium experiences high fluid shear stress since our process is highly sensitive to the dispersion of the reactants. In a preferred embodiment, the capping reaction is carried out while introducing the acyl halide to the quinone-coupled polyphenylene oxide solution at a point or region within a reaction environment near a mixing impeller, e.g. an axial-flow or radial flow impeller, such as a marine-type mixing propeller, fan turbine, pitched paddle, curved blade turbine, spiral backswept turbine, flat-blade turbine, gate impeller, anchor impeller, etc., in order to establish and maintain high fluid shear rates and accordingly relatedly high fluid shear stresses. The addition of acyl halide under the aforesaid process conditions facilitates the establishment and maintenance of a substantially uniform dispersion of reactants, acyl halide, quinone-coupled polyphenylene oxide, water soluble base, and catalytic phase transfer agent, and accordingly optimum process efficiency. In general, process equipment employing high-speed axial-flow impeller mixers are presently preferred in our process.

Advantageously and preferably, our process is carried out employing substantially the exact stoichiometric amounts of acyl halide required to completely cap essentially all of the hydroxyl components associated with the quinone-coupled polyphenyl oxide reactants. Preferably the acyl halide is added to the reaction medium continuously during the course of the reaction so that the exact stoichiometric acyl halide requirements for completion of the capping reaction are only satisfied as the last portion of acyl halide is added to the reaction medium.

In a preferred embodiment, our process is carried out in the substantial absence of any hydrolyzing agent, e.g. water methanol, etc., or other chemical constituents which can promote undesirable side reactions, such as primary or secondary amines. Accordingly, it is highly desirable that the individual and preferably the collective water, methanol, etc., primary and secondary amine content be limited to less than 1%, and more preferably less than ½% based on the weight of quinone-coupled polyphenylene oxide reactant.

The acyl halide coupling reaction is carried out in the presence of water soluble base, preferably in solution in an aqueous phase. The water soluble base can be any water soluble base which, in the presence of polyphenylene oxides, can convert substantially all of the hydroxy groups associated therewith to phenoxides, i.e. alkali metal or alkaline earth metal cation phenoxides or "onium" phenoxides derived from catalytic phase transfer agents described in greater detail later herein. Further illustrative of the bases that can be employed are alkali metal or alkaline earth metal hydroxides and carbonates, e.g. potassium hydroxide, sodium hydroxide, sodium monocarbonate, barium carbonate, etc. In general, any amount of water soluble base can be employed, e.g. 0.1 to about 1000, preferably 1 to about 20, and more preferably 1.5 to about 5 moles of base per hydroxyl group associated with the polymers as identified by hydroxyl group infrared absorption at 3610 cm.$^{-1}$ based on a 2.5% solution in a $CS_2$ over a 1 cm. path calibrated against $CS_2$ in a matched cell. Further, preferably, the water soluble base is employed in solution in an aqueous phase wherein the water soluble base content is at least 10% and more preferably at least 25-50% by weight of the aqueous base solution.

Preferably the acyl halide capping reaction is carried out in the presence of a catalytic phase transfer agent. The agent can be any phase transfer agent known to those skilled in the art, e.g. quaternary ammonium compounds, quaternary phosphonium, tertiary sulfonium compounds, etc., including mixtures thereof. Presently preferred phase transfer agents can be described by the formulae:

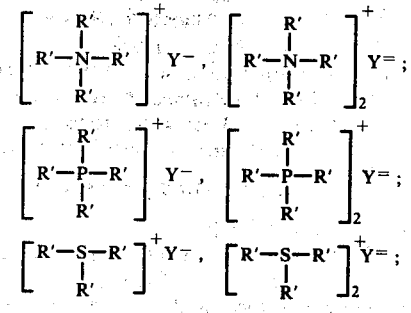

wherein each R' is independently selected from aliphatic hydrocarbon radicals having from about 1 to about 30 carbon atoms, preferably from about 2 to about 15 carbon atoms, each $Y^-$ is selected from the group consisting of $Cl^-$, $Br^-$, $F^-$, $CH_3SO_3^-$, $CH_3CO_2^-$, $CF_3CO_2^-$ or $OH^-$, and each $Y^{--}$ is selected from the group consisting of $SO_4^{--}$, $CO_3^{--}$, or $C_2O_4^{--}$. The catalytic phase transfer agents can also be employed in any amount, e.g. in amounts of from 0.001 to 10, preferably from 0.01 to 1.0, and more preferably from 0.05 to 0.5 moles based on the molar amounts of hydroxyl groups associated with the polymer.

Broadly, reaction time can be any time, e.g. 1/10 hour or less, to 10 hours, or more. Broadly, the reaction temperature can be any temperature, e.g. 0° C. or less to 150° C. or more. Broadly, the reaction pressures can be any pressure, e.g. subatmospheric, atmospheric or superatmospheric. Preferably, the reaction is carried out under optimum time, temperature and pressure reaction conditions which integrates substantially all, e.g. 90-99% or more of the acyl halide contained within the reaction medium into the polymer backbone during the process. Broadly, the acyl-capped quinone-coupled polyphenylene oxides can be isolated from the reaction medium by any means employed heretofore to isolate the polymer produced by the processing of Hay and Orlander. Preferably, the products of our process are isolated from the reaction medium by spray drying, steam precipitation or any other method which avoid costly distillation procedures involved in the separation by distillation of mixed solvents.

In order that those skilled in the art may better understand my invention, the following example is given which is illustrated with the best mode of practicing our invention.

EXAMPLE I (A) Polymer Preparation

A 2.5 gallon stainless steel reactor equipped with an air-driven paddle stirrer, oxygen inlet tube, and water-cooled coil and jacket was charged with 5.48 l. toluene, 121.2 ml. of a stock catalyst solution, i.e. (29.5 ml. bromine added slowly to a chilled solution of 7.76 g. cuprous oxide and 132.0 g. 2,6-xylenol in methanol, then diluted to 1.0 l.), 4.51 g. N,N'-di(t-butyl)ethylenediamine (DBEDA), 26.5 g. N,N-dimethylbutylamine (DMBA), and 16.0 g. di(n-butyl)amine (DBA). Oxygen was bubbled into the resulting admixture at a rate of 10 SCFH while vigorously agitating the admixture, 1600 g. of 2,6-xylenol dissolved in 1.8 l. toluene was pumped into the reactor over a 30 minute period. Summarily, the reaction prameters relative to molar ratios of 2,6-xylenol:Cu:DBEDA:DMBA:Br:DBA were as follows: 1000:1:2:20:8:9.4. The reaction temperature was maintained at 25° C. throughout the monomer addition, and was increased to and maintained at 40° C. until the reaction was terminated.

(B) Catalyst Deactivation

The reaction was terminated after 58 minutes (measured from start of monomer addition) by replacing oxygen with nitrogen and the addition of 16.0 ml. 38% Na$_3$EDTA in water. Polymer analysis showed an [η] equal to 0.59 dl./g. and an OH absorbance of 0.042 units.

(C) Quinone Coupling

The resulting TMDQ containing reaction mixture was heated under nitrogen at 50° to 60° C. for 30 minutes and then at 95° C. for 15 minutes. At this point the mixture no longer exhibited the characteristic TMDQ color. Polymer analysis after methanol precipitation, washing and drying the polymer sample collected on a filter, washed with methanol and dried in a circulating air oven at 80° C. showed an [η] equal to 0.53 dl./g., and an OH absorbance of 0.139 units.

(D) Capping (1) One-half of the resulting quinone-coupled polyphenylene oxide reaction mixture was cooled to 60° C., transferred to a 2.5 gallon stainless steel reactor equipped with a high-shear stirrer (Polytron homogenizer), nitrogen inlet tube and heating coils. 35.5 ml. of a 10% solution of Aliquat ® 336 in toluene and 16.7 g. 50% aqueous NaOH was added. The mixture was stirred vigorously under nitrogen for 2 minutes and then 19.7 ml. acetic anhydride in 30 ml. toluene was added over a 3 minute period. The reaction mixture was diluted with an equal volume of toluene, washed with an equal volume of water and passed through a liquid-liquid centrifuge to remove the aqueous phase. Methanol was added to precipitate the acetate capped polymer. Polymer analysis after methanol washing and drying showed an intrinsic viscosity [η] equal to 0.53 dl./g. as measured in chloroform at 25° C., a hydroxyl end group infrared absorbtion at 3610 cm.$^{-1}$ of 0.004, and a nitrogen content of 1038 ppm.

(2) The remaining half of the resulting quinone-coupled polyphenylene oxide reaction mixture was acetylated and washed as described in (D)(1) above, then isolated by steam precipitation by spraying the capped quinone-coupled polyphenylene oxide reaction mixture with steam through a nozzle into water at 95° C. at a rate sufficient to provide rapid azeotropic removal of toluene and other materials such as amines. The steam precipitated solid polymer is collected on a filter, washed with additional water and dried at 90° C. in a circulating air oven. Polymer analysis showed an intrinsic viscosity [η] equal to 0.53 dl./g., and OH absorbance at 3610 cm.$^{-1}$ of 0.001 units, in a nitrogen content of 1267 ppm.

A summary of polymer processing and results are set out in Table I hereafter:

TABLE I

| Process Step(s) | Reaction Temp. °C. | [η] dl./g. | OH Absorbance at 2610 cm.$^{-1}$ |
|---|---|---|---|
| (A) Polymer Preparation, and | | | |
| (B) Catalyst Deactivation | 25–40 | 0.59 | 0.042 |
| (C) Quinone Coupling | 50–95 | 0.53 | 0.139 |
| (D) Capping | 60 | | |
| (1) Methanol precipitation | | 0.53 | 0.004 |
| (2) Steam precipitation | | 0.53 | 0.001 |

As illustrated by the foregoing examples, anhydrides of monocarboxylic acids can be reacted effectively with quninone-coupled polyphenylene oxides. Analogous results are obtained wherein other anhydrides of monocarboxylic acids or any of the monoacyl halides, the monosulfonyl halides, the alkyl halides, or the dialkylsulfates described hereinbefore are employed in our process.

Acyl capped quinone-coupled polyphenylene oxides prepared by our process can have any intrinsic viscosity and any number average molecular weight $\overline{M}_n$. Presently preferred polymers generally have an $\overline{M}_n$ value of 5,000 to 60,000, more preferably 15,000 to 30,000, having generally corresponding intrinsic viscosities of 0.17 to 1.7, and 0.4 to 0.7, respectively.

The polymers of this invention can be combined with other fillers, modifying agents, etc., such as dies, pigments, stabilizers, flame retardant additives with beneficial results.

We claim:

1. A process for capping quinone-coupled polyphenylene oxides which comprises contacting quinone-coupled polyphenylene oxides with a capping agent selected from the class consisting of monoacyl halides, monosulfonyl halides, anhydrides of monocarboxylic acids, alkyl halides, or dialkylsulfates, wherein said contacting is carried out in a high fluid shear stress reaction medium at a temperature within the range of from about 0–150° C. in the presence of a water soluble base and a catalytic phase transfer agent.

2. A claim 1 process, wherein the quinone-coupled polyphenylene oxide is of the formula

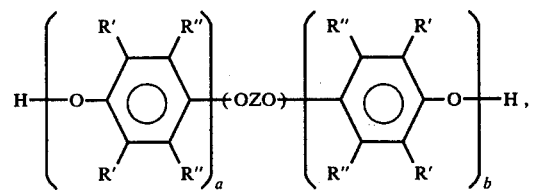

wherein independently each $-(OZO)-$ is a divalent quinone residue, Z is a divalent arene radical, either a or b is at least equal to 1, R' is hydrogen, a hydrocarbon radical, a halohydrocarbon radical having at least 2 carbon atoms between the halogen atoms and phenol nucleus, a hydrocarbonoxy radical, or a halohydrocarbonoxy radical having at least two carbon atoms between the halogen atoms and phenol nucleus, R" being the same as R' and, in addition, halogen, and wherein the monoacyl halides, monosulfonyl halides, anhydrides of monocarboxylic acids, alkyl halides, and dialkylsulfates are of the formulae, respectively:

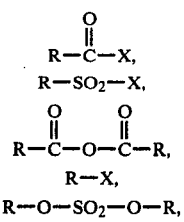

including mixtures thereof, wherein R is alkyl, cycloalkyl, aryl or mixtures thereof, and X is chlorine, bromine, fluorine or iodine.

3. A claim 2 process, wherein the water soluble base is selected from alkali metal or alkaline earth metal hydroxide or carbonate bases and the catalytic phase transfer agent is selected from quaternary ammonium, quaternary phosponium, tertiary sulfonium compounds or mixtures thereof.

4. A claim 3 process, wherein R' is hydrogen, a hydrocarbon or a halohydrocarbon radical and the sum of a plus b is at least 10.

5. A claim 4 process, wherein each R' is a hydrocarbon radical and the sum of a plus b is 40 to 170.

6. A claim 5 process, wherein each R and R' is a methyl radical.

7. A claim 6 process wherein substantially the exact stoichiometric amount of capping agent required to completely cap essentially all of the hydroxyl components associated with the quinone-coupled polyphenylene oxide is present.

8. The claim 7 process wherein the capping agent is added continuously during the course of the reaction so that the exact stoichiometric capping agent requirement for completion of the capping reaction is only satisfied as the last portion of the capping agent is added to the reaction medium.

9. The claim 8 process carried out in the substantial absence of any hydrolyzing agent.

10. The claim 9 process wherein the reaction medium contains less than about 1% by weight hydrolyzing agent based on the weight of quinone-coupled polyphenylene oxide reactant.

* * * * *